United States Patent Office 3,429,460
Patented Feb. 25, 1969

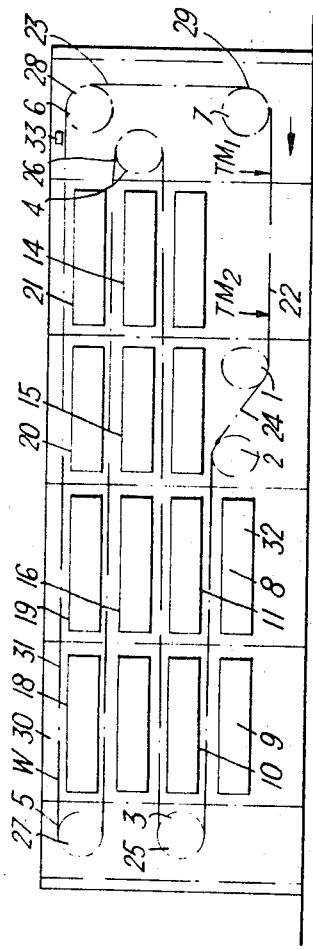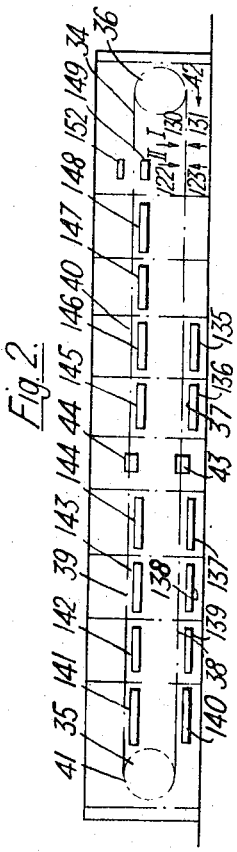

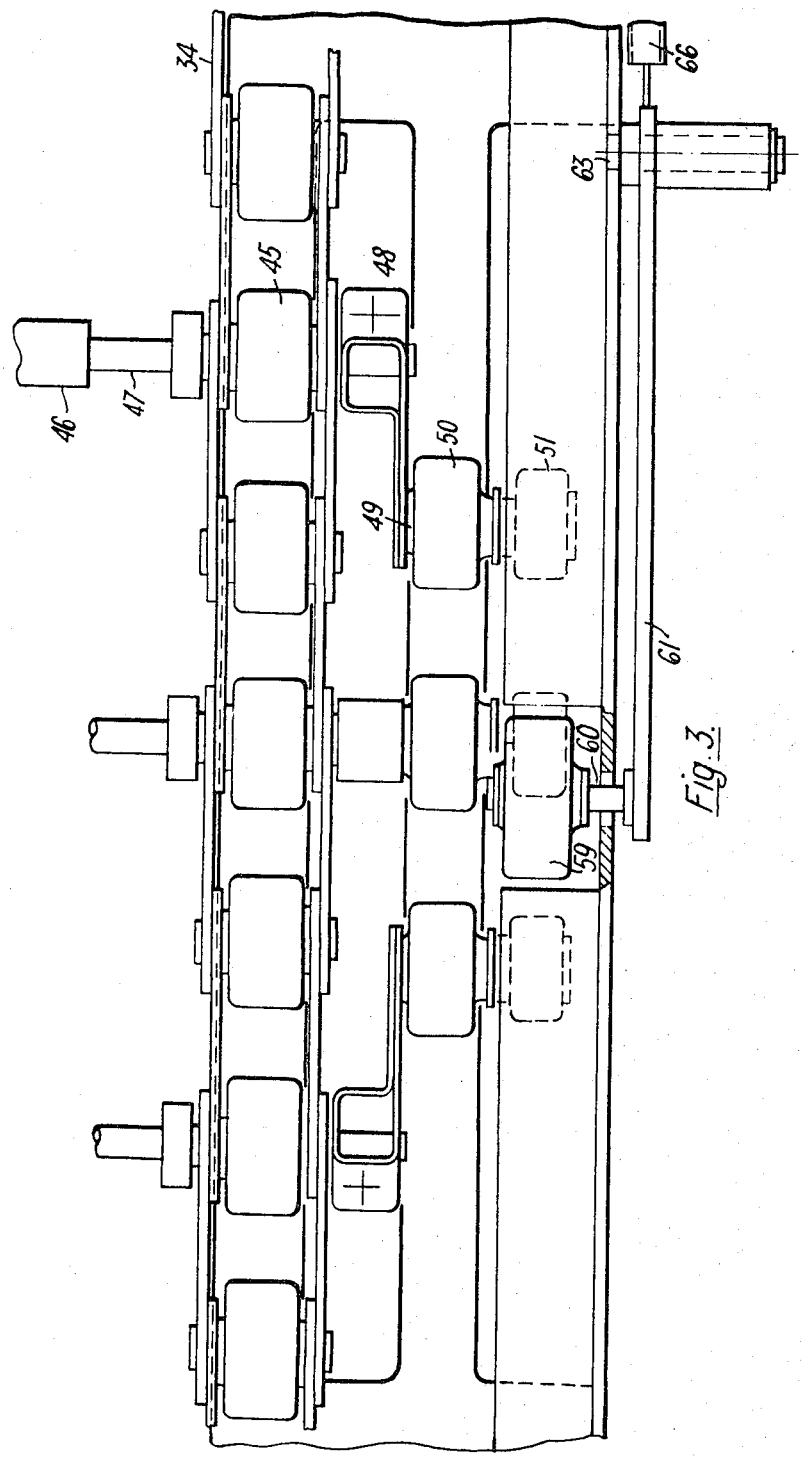

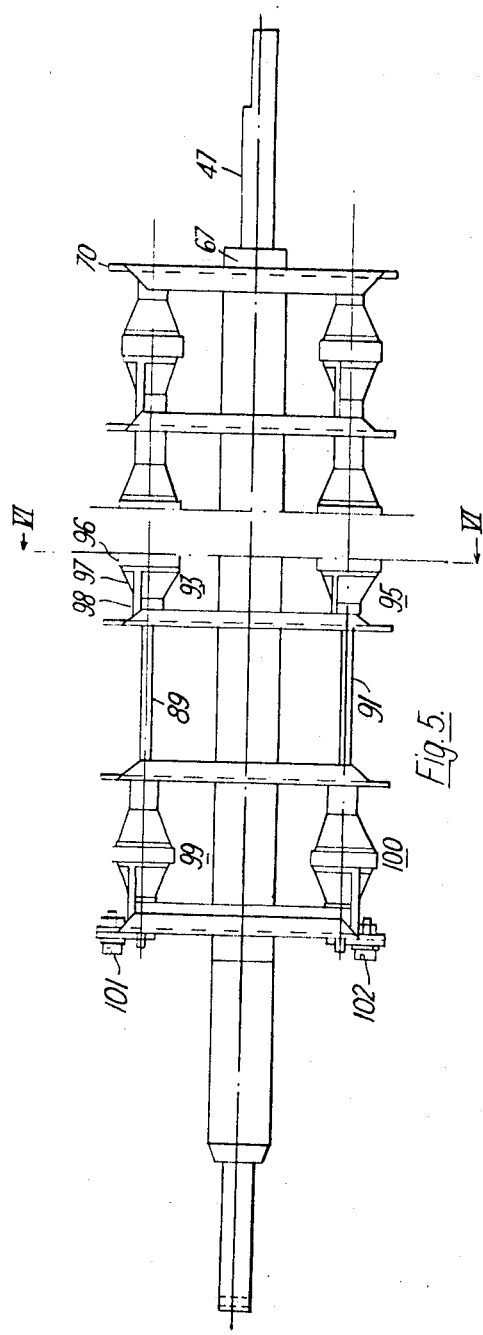

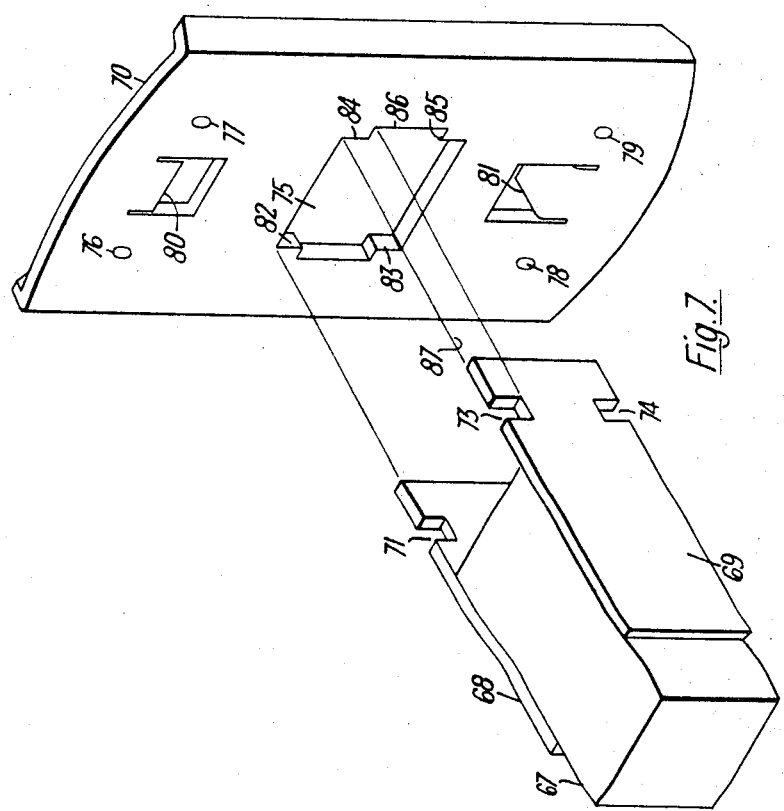
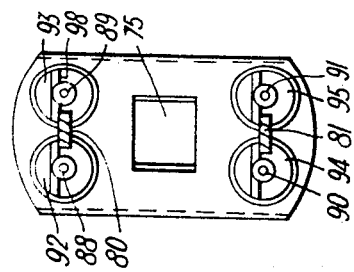

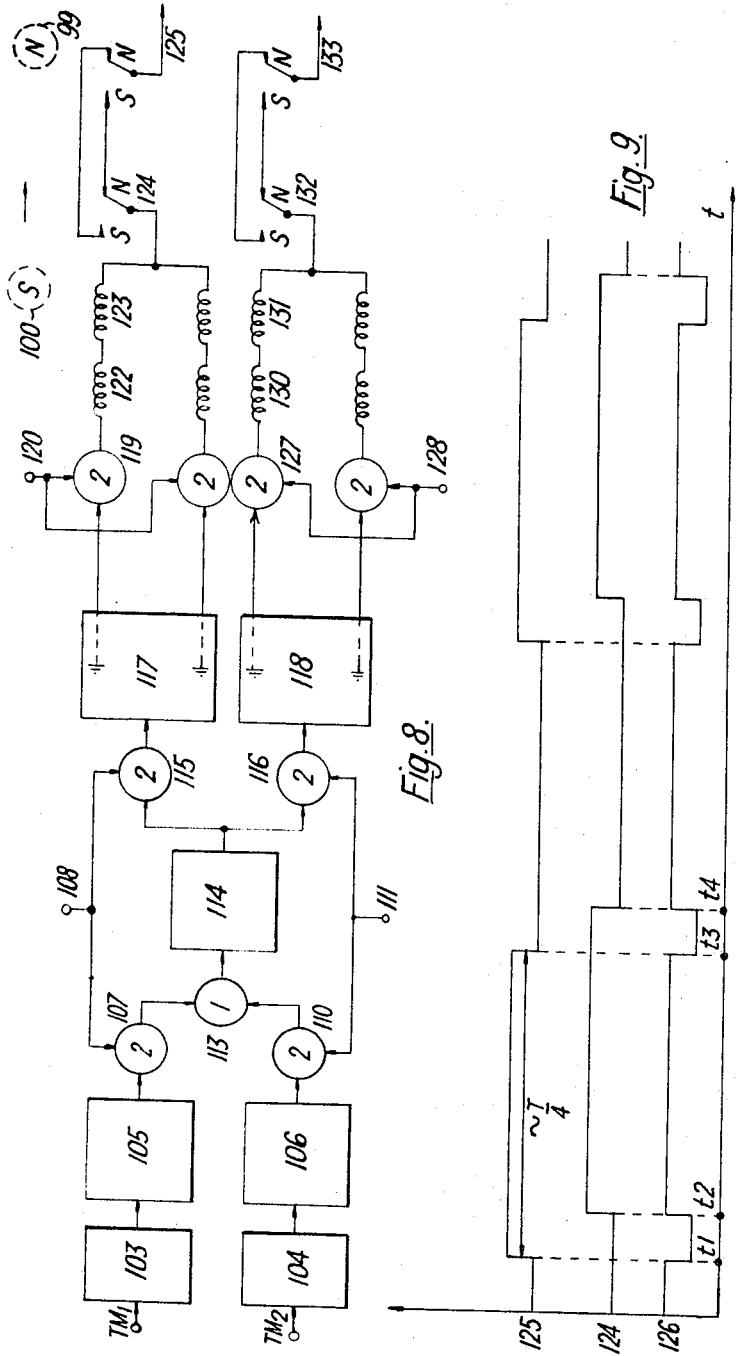

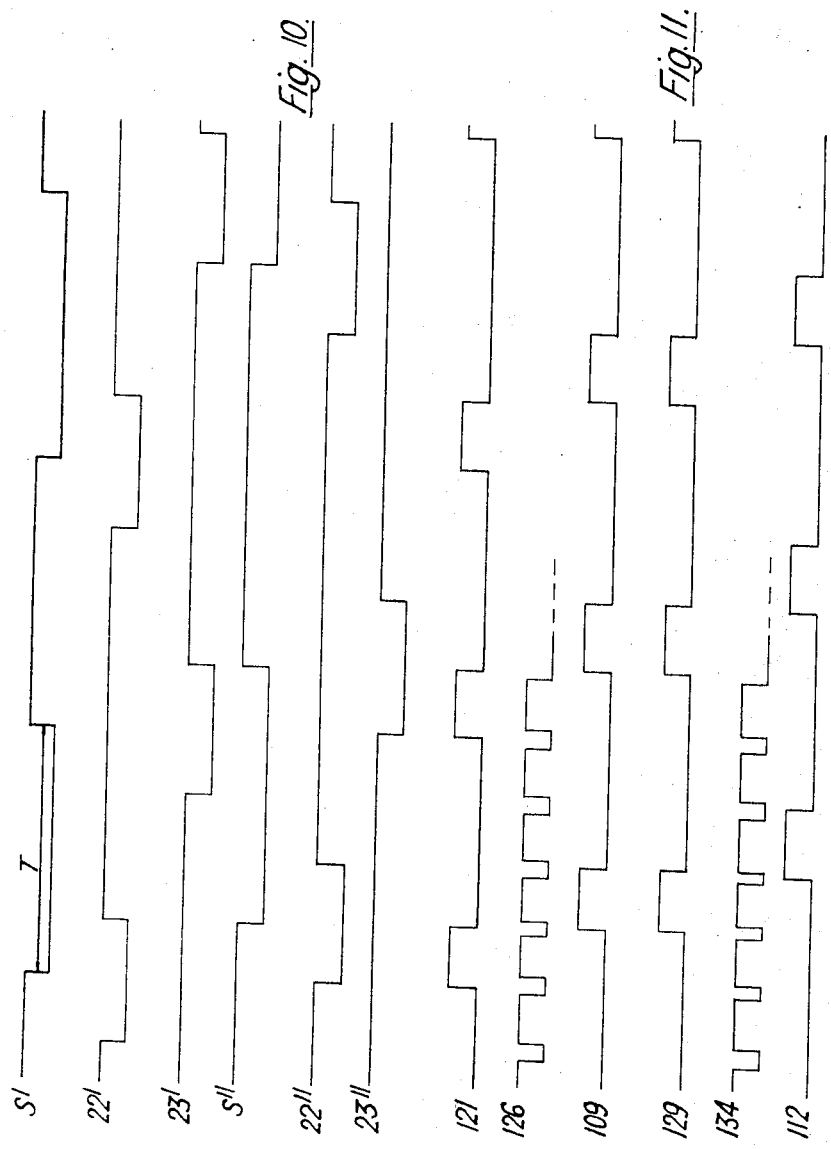

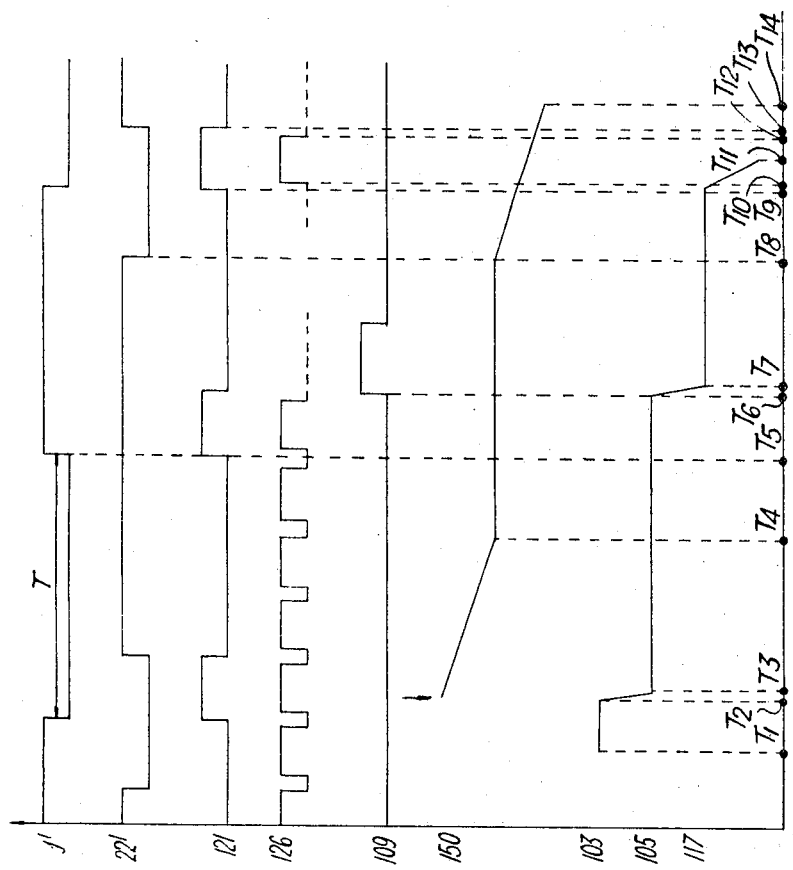

3,429,460
CONTROL MEANS FOR A MULTITURN ENDLESS CONVEYING APPARATUS
Georges Xavier Lens, Evere, Jozef Maria van Brabant, Boechout-Antwerp, and Franciscus Joannes Julia Hendrickx, Berchem-Antwerp, Belgium, assignors to International Standard Electric Corporation, New York, N.Y., a corporation of Delaware
Filed Apr. 1, 1966, Ser. No. 539,337
Claims priority, application Netherlands, Apr. 20, 1965, 6505022
U.S. Cl. 214—11            16 Claims
Int. Cl. B65g 47/34, 43/00

ABSTRACT OF THE DISCLOSURE

A letter sorting machine including an endless main conveyor and transfer means. Letter containers are coupled to the conveyor and moved thereby adjacent to plurality of letter destination bins. An auxiliary conveyor moves synchronously with the main conveyor and carries a plurality of magnetic bistable code recorders which register the letter destination bins. The code recorders are moved along a plurality of detection means which are actuated by corresponding codes in the recorders to operate the transfer means to transfer the letters to the proper destination bin.

---

This invention relates to a magnetic bistable device for cooperating with a magnetizing source with at least two stable conditions. The bistable device comprises a first rotatable permanent magnet associated with said source and a second rotatable permanent magnet. Each of these magnets have two poles and are mounted in close proximity to each other, whereby when said first permanent magnet is operatively associated with said magnetizing source said first and second permanent magnets remain in their position or are both angularly displaced towards a position wherein the pole of said first permanent magnet that has a polarity opposed to that exhibited by said magnetizing source is nearest to said magnetizing source.

Such a magnetic bistable device is already known from the U.S. patent application of one of the co-inventors herein, namely, F. Hendrickx filed on Oct. 23, 1966, Ser. No. 318,270, now U.S. Patent No. 3,370,278 and assigned to the assignee of this application. When this device is mounted on a conveyor and is moved in operative association with said magnetizing source, it has been empirically found that in some cases said first and second permanent magnets are both angularly displaced towards a position wherein the pole of said first permanent magnet that has a polarity opposed to that exhibited by said magnetizing source is not nearest to said magnetizing source, due to said magnets having made one or more complete rotations instead of a single rotation of 180°. When such a wrongly set bistable device is for instance used in a control system of a sorting machine, correct operation is obviously impossible.

It is therefore an object of the present invention to provide a magnetic bistable device of the above type which is prevented from being wrongly set because the permanent magnets are precluded from making a rotation larger than 180°.

The magnetic bistable device according to the invention is characterized in that it includes stop means for preventing each said main or first and auxiliary or second rotatable permanent magnets from making a rotation larger than 180°.

The magnetic bistable device according to the invention is also characterized in that a second magnetizing source is associated with said second rotatable permanent magnet and that the polarity exhibited by said second magnetizing source is opposed to that exhibited by said magnetizing source.

The present invention also relates to control systems using the magnetic bistable devices made according to the invention, and more particularly to control systems used in conjunction with a transporting device, a sorting machine, a bar carrier for a plurality of plates and a control system for registering information.

The transporting device is of the type comprising at least one conveyor belt or chain. A carrier is coupled to the conveyor belt or chain by means of a first axle which is rotatably mounted in a point of said belt or chain. A lever arm is rigidly secured at one end to said first axle and carries at its other end, roller means which are freely rotatable about a second axle parallel to said first axle. The axles are guided by first and second parallel guide plates. This transporting device is characterized in that at least one portion of said first and second parallel guide plates are so shaped, that considered in a plane perpendicular to said axles, the trajectory followed by said roller means when travelling along said shaped portions of said guide plates and the trajectory followed by said chain substantially form a triangle. When said roller means are moved between said shaped portions of said guide plate, by said belt or chain, the angle between said lever arm and said trajectory of said belt or chain gradually increased to a maximum, means being provided for temporarily maintaining said roller means in the position attained when said maximum angle is reached, so as to compel said lever arm, and hence said carrier, to pivot about said second axle, whereafter said angle between said lever arm and said trajectory of said belt or chain gradually decreases to zero.

The sorting machine is of the type including an endless main conveyor for moving a number of article holders along a number of destination bins, and an endless auxiliary conveyor moving in synchronism with said main conveyor for conveying a number of code recorders. The code recorders comprise a number of bistable recorder elements for registering a destination code. Detection means are provided which cooperate with the recorders in such a manner that said detection means operate transfer means for transferring an article from a said article holder towards a destination bin when the corresponding code recorder that passes along the detection means associated with the destination bin has a code which corresponds to the recorded destination code. This sorting system is characterized in that said main and auxiliary conveyors each comprise curved portions, that said article holders each comprise a certain number "p" compartments. A corresponding number "p" of said code recorders are mounted on the said carrier. First guiding means are associated to said main conveyor to ensure that the p-compartment article holders maintain their position in space when said main conveyor moves along its curved portions whereby the order, with respect to the direction of advancement of said main conveyors of compartments of each said p-compartment article holder is inverted m times. Second guiding means and/or inversion means are associated to the curved and straight portions of said auxiliary conveyor respectively. The second guiding means ensures that the carriers maintain their position in space when said auxiliary conveyor moves along its curved portions whereby the order, with respect to the direction of advancement of said auxiliary conveyor of the p code recorders of each said carrier is inverted. The inversion means pivots said carrier in such a manner that said order of said p code recorders of each said carrier is inverted, and that the total number of inversions produced by said second guiding means and by said inversion means is equal to the number m.

The bar carrier is characterized in that it is constituted by a bar having two identical strips arranged along opposite longitudinal sides of said bar. The strips are provided at each of their longitudinal sides with a plurality of oppositely located transverse incisions. A plurality of plates each provided with at least one aperture are mounted perpendicularly on said strips at the place of said incisions. The bar is slid through the apertures of said plates and is secured therebetween thereby fixing said plate on said bar due to the shape of said aperture in each said plate. The shape of the apertures are substantially identical to the cross-section of said bar plus that of said two strips at the place of said incisions.

The control system is of the type including one or more sets of fixedly mounted electrically operated coding means for coding information in a plurality of sets of recorder devices, and conveying means for carrying the recorder devices past said coding means. This control system is characterized in that the electric operating circuits of said sets of coding means include fixedly mounted electric contacts and that said conveying means also carry permanent magnets which when conveyed past said electric contacts operate said contacts in order to actuate said operating circuits and to operate said coding means.

The above mentioned and other objects and features of the invention will become more apparent and the invention itself will be best understood by referring to the following description of embodiments taken in conjunction with the accompanying drawings in which:

FIG. 1 is a schematic view of a main conveyor included in a letter sorting machine using magnetic bistable devices according to the invention;

FIG. 2 is a schematic view of an auxiliary conveyor included in the above mentioned sorting machine;

FIG. 3 is a detailed partial top view of an inversion mechanism forming part of the auxiliary conveyor of FIG. 2;

FIG. 5 is a detailed partial top view of a bar carrier forming part of the auxiliary conveyor of FIG. 2;

FIG. 6 is a cross-section along line VI—VI of FIG. 2;

FIG. 7 is a perspective exploded view of a part of the bar carrier of FIGS. 5 and 6;

FIG. 8 shows control means adapted for cooperation with the above mentioned auxiliary conveyor;

FIG. 9 is a time diagram of pulses used in the control means of FIG. 8;

FIG. 10 is a time diagram of pulses for controlling transfer mechanisms adapted for cooperation with the above mentioned main conveyor;

FIG. 11 is a time diagram showing other pulses used in the control means of FIG. 8; and FIG. 12 is a time diagram showing the displacement of letters in the transfer mechanism of FIG. 10 and the shift of information in the control means of FIG. 8.

Figure 4:
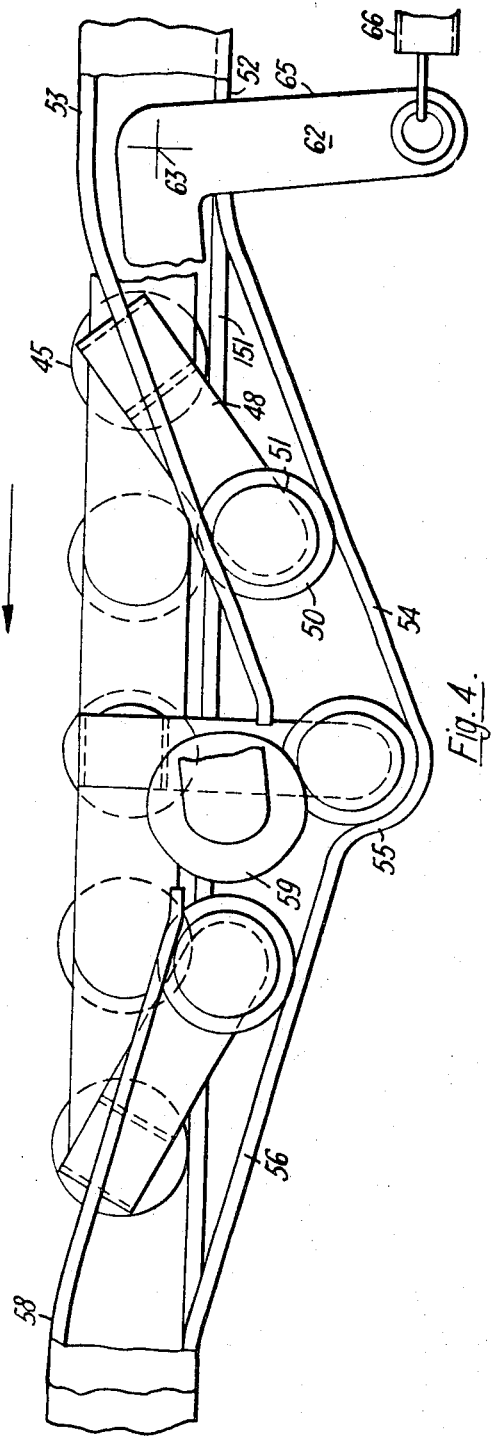
FIG. 4 is a front view of FIG. 3.

The present invention will be described with relation to a letter sorting machine of the type disclosed in U.S. Patent No. 2,807,376 which issued on Sept. 24, 1957, and is assigned to the assignee of this application. This sorting machine includes an endless main conveyor and transfer means, for moving a number of letter holders, along a number of letter destination bins, and an endless auxiliary conveyor. The latter conveyor is displaced in synchronism with the main conveyor and conveys a number of code recorders, each comprising a number of bistable recorder elements for registering a destination code, along a number of detection means which are able to operate the transfer means associated to a letter holder. When a code recorder passes along the detection means associated to the letter destination bin, the code of which corresponds to the destination code recorded in the code recorder, the transfer means associated to the letter holder operates and the letter contained therein is transferred to this letter destination bin.

The main conveyor is of the type disclosed in the U.S. Patent No. 3,300,026 which issued on Jan. 24, 1967, and is assigned to the assignee of this application. The main conveyor is by a pair of parallel endless chains which are each driven in a serpentine fashion around the toothed wheels 1 to 7 of FIG. 1, so as to present the straight horizontal portions 8 to 22, a straight vertical portion 23, a straight inclined portion 24 and five curved portions 25 to 29. A plurality of double-compartment letter holders, such as 30, is arranged between the above pair of endless chains, such as 31. Each of these letter holders is provided with transfer means constituted by a lever arrangement (not shown) for opening its bottom and with means for cooperating with the guiding means arranged along the main conveyor. The cooperating means assures that the letter holder maintains its position in space when conveyed by the endless chains 31. Below the straight horizontal portions 8 to 21 is arranged a plurality of e.g. 140 letter bins, each series of bins forming a unit, such as the one indicated by 32. To each bin is associated a transfer electromagnet (not shown) forming part of the above mentioned detection means and able to operate, when energized, the lever arrangement of a letter holder in order to open the latter.

The sorting machine is adapted to be controlled by two operators OP1 and OP2 by means of two identical transfer mechanisms (not shown) of the type disclosed in the U.S. patent application Ser. No. 427,748, filed on Jan. 25, 1967, and assigned to the assignee of this application. The transfer mechanism terminates at the respective positions TM1 and TM2 located above the straight horizontal portion 22 of the main conveyor shown in FIG. 1. A reset member 33 for the letter holders is mounted above the main conveyor 31 near the curved portion 28.

Each of these two identical transfer mechanism TM1, TM2 is adapted to transfer letters onto the main conveyor under the control of an operator (OP1 and OP2) and includes a keyboard for indexing e.g. 3000 possible destinations of the letters by keying the four figures characterizing each such destination. It also includes a push-button for transferring each letter which has been indexed on the movable bottom flap of one of the two chutes, depending on the position of a cam controlled contact at the moment of depressing this push-button. Afterwards the letters are conveyed on a conveyor and dropped into a letter holder of the main conveyor. The transfer mechanisms are neither shown nor described in detail in this application but the time diagram of FIG. 10 shows the displacements of the bottom flaps 22′, 22″ and 23′, 23″ and of the cam controlled contacts $s'$, $s''$ which determine a time period T equal to 500 milliseconds. These bottom flaps and contacts are identical to the corresponding elements 22, 23, $s$ shown in the last mentioned U.S. patent application Ser. No. 427,748, but the opening and closure times of the elements 22′, 22″, 23′, 23″, $s'$, $s''$ are somewhat different from those of the elements 22, 23, $s$. Hereby it should be noted that there exists a time shift equal to $T/4$ between the movements of the elements 22′, 23′, $s'$ and 22″, 23″, $s''$. This time shift of $T/4$ has been chosen in order that it should easily by possible to make two other operators control the sorting machine, all these operators being able to handle one letter per time period T.

The transfer mechanism TM1 also includes a timing arrangement which is able to generate so called setting authorization pulses 121 (FIG. 11) having a duration equal to $T/4$ and the starts of which coincide with the starts of the time periods T determined by the contact $s'$. It is also able to generate a so called transfer pulse 109 (FIG. 11) having a duration equal to $T/4$; the start of which coincides with the end of the preceding setting authorization pulse 121, each time the push-button of transfer mechanism TM1 has been depressed during a preceding time period T determined by the contact $s'$. In an analogous manner the transfer mechanism TM2 also includes a timing arrangement which is able to generate so called setting authorization pulses 129 (FIG. 11) having a duration equal to $T/4$ and the starts of which coincide with the starts of the time periods T determined by the contact s″. It is also able to generate a so called transfer pulse 112 (FIG. 11) having a duration equal to T/4 and the start of which coincides with the end of the preceding setting authorization pulse 129, each time the push-button of the transfer mechanism TM2 has been depressed during a preceding time period T determined by the contact s″. Since the above timing arrangements do not form part of the invention, they are not shown in detail.

The endless auxiliary conveyor is constituted by a pair of endless chains, such as 34, carried by the toothed wheels 35, 36. These chains each have four straight portions 37 to 40 and two curved portions 41, 42, the straight portions 37 and 38, as well as 39 and 40 being separated by a schematically represented inversion mechanism 43, 44 which will be described in detail later. The endless chains, such as 34, are of the same type as those of the main conveyor and are connected to and supported by a plurality of rollers, such as 45 (FIG. 3), which are secured to the conveyor chain between each pair of links thereof. One hundred and sixty carriers, such as 46, for two code recorders are arranged between these chains, the axle 47 of each of these carriers extending through two opposite rollers 45. The end of the axle 47 protruding beyond the conveyor chain 34 is secured to one end of a link 48 to the other end of which is fixed a pivot axle 49 about which two rollers 50 and 51 are able to rotate freely. The rollers 45 and 50 are supported along the horizontal parts 37 to 40 of their travel by the lower guide plate 52, whereas the roller 51 is guided by the upper guide plate 53 which is parallel to the guide plate 52. In the circular parts 41, 42 of their travel the rollers 45 which form part of the conveyor chains 34 and the rollers 50, 51 which form part of the carriers 46 are guided in the same way as the corresponding elements of the main conveyor, this manner being therefore not shown in the present drawings.

The above inversion mechanisms 43, 44 are symmetrical and only one of them, namely 43, will therefore be described in detail. Between the horizontal straight portions 37 and 38 (FIG. 2) and considered in the direction of travel of the chains 34, the guide plate 52 has a flat portion 151, a straight downwardly inclined lower portion 54, an abutment portion 55 and a straight upwardly inclined portion 56. The upper guide plate 53 also has a downwardly inclined portion 57, parallel to the portion 54, and an upwardly inclined portion 58, parallel to the portion 56, but these portions 57, 58 are separated by an opening. In this opening are mounted resilient pressure means which are constituted by a roller 59 which is freely rotatable about the axle 60 mounted at the free end of the arm 61 of an L-shaped lever 62. This lever is pivoted in 63 to the frame 64 at the junction of its two arms 61, 65 and the free end of the latter arm 65 is connected to the frame by means of the spring 66.

The above inversion mechanism operates as follows. When the roller 45 of the conveyor chain 34 associated to the axle 47 of a carrier 46 arrives in proximity of the portion 151 of the guide plate 52 the roller 50 of a carrier 46 is supported by the inclined portion 54, whereas the roller 51 is guided by the guide 57. Thus the angle between the lever arm 48 and the trajectory followed by the roller 45 gradually increases and reaches its maximum when the roller 50 is located against the abutment portion 55. Due to this abutment and the pressure exerted on the roller 51 by the pressure roller 59 in a rearward direction with respect to the direction of travel of the chains 34 the roller 50 is temporarily withheld in the position attained so that the lever arm 48 is pivoted in the anticlockwise direction. Afterwards the rollers 50, 51 are upwardly displaced along the inclined guide plate portions 56, 57 respectively, due to which the above angle is gradually decreased towards zero. From the above it follows that the lever arm 48 and hence the carrier 46 connected therewith have both made a rotation of 180°.

The above mentioned carrier 46 for two code recorders includes the above axle 47, two identical relatively flexible strips 68, 69 arranged along opposite longitudinal sides of the bar and fourteen identical plates 70 provided with two bent edges. Each of the strips 68, 69 is provided along its longitudinal edges with a plurality of oppositely located incisions 71, 72 (not shown), 73, 74 and each of the plates 70 is provided with an aperture 75, with a pair of holes 76, 77 and 78, 79 on each side of the aperture 75 and with a lip 80, 81 punched out of the plate 70 between each of these pairs of holes 76, 77 and 78, 79. The aperture 75 has four edge parts 82, 83, 84, 85 the width 86 of which is substantially equal to the thickness 87 of the strips 68, 69. In order to assemble the bar 67, the strips 68, 69 and the plates 70, each plate 70 is positioned on the two strips at the place of the transverse incisions 71, 72, 73, 74 in such a manner that the edges 82, 83 and 84, 85 are at least slightly engaged in the incisions 71, 72, 73, 74 of the strips 68, 69 respectively. The bar 67 is then slid through the aperture 75 of the plate 70 thereby fixing this plate 70 on the bar 67 due to the above edges being then completely engaged in the corresponding incisions. This is possible due to the fact that the shape of the aperture 75 in the plate 70 is identical to the cross-section of the bar 67 plus that of the two strips 68, 69 at the place of the incisions 71, 72, 73, 74. When the 14 plates 70 have thus been fixed on the bar 67 the strips 68, 69 are secured to this bar 58 by a single rivet (not shown) and the rods 88, 89, 90, 91 are inserted through the corresponding holes 76, 77, 78, 79 in the various plates 70. Each of these rods passes through the centres of gravity of 11 rotatable permanent magnets such as 92, 93, 94, 95, which are arranged between the 12 first plates 70, and of a fixedly mounted permanent magnet which is arranged between the thirteenth and fourteenth plates 70.

Each of these rotatable permanent magnets has the shape of a ring 96 which is mounted around a body 97 made in a nonmagnetic material, e.g., nylon, and is provided with a lateral wing member 98 which is somewhat excentric with respect to the rod about which the magnet is able to pivot. The lateral wing members of the pair of rotatable permanent magnets, such as 92, 93, which are freely rotatable about rods 88, 89 mounted at opposite sides of a same lip, such as 80, of a plate 70 make contact with this lip. Each such cooperating pair of permanent magnets 92, 93 constitutes a magnetic bistable device of the type disclosed in the aforementioned U.S. patent application Ser. No. 318,270. Each of these magnets of such a bistable device has two poles and when one of these magnets is operatively associated with a magnetizing source, e.g. a setting electromagnet, the permanent magnets remain in their position or are both angularly displaced towards a position wherein the pole of this one magnet having a polarity opposed to that exhibited by the magnetizing source is nearest to this source. Due to the wing members of the rotatable permanent magnets 92, 93 of each magnetic bistable device making contact with the same lip 80, acting as a stop member, these magnets cannot be rotated over an angle larger than 180°, so that one is always sure that a bistable device which has been set is in its correct position. As will be described later, instead of operatively associating only one of the two magnets of a bistable device with a magnetizing source, it is preferred to simultaneously associate the other of these two magnets with another magnetizing source, the polarity exhibited by this latter source being opposed to that of the former source, since in this manner these two magnets are either very strongly maintained in their position or are very rapidly urged into their other position.

Between the twelfth and the thirteenth plates 70 of each carrier 46 no permanent magnets are mounted, whereas, as mentioned above between the thirteenth and fourteenth plates 70 two permanent magnets 99, 100 are fixedly mounted on the adjacent rods 89, 91 by means of the respective screws and nuts 101, 102. For reasons of uniformity these fixed permanent magnets 99, 100 are of the same type as the rotatable permanent magnets. The north pole of the permanent magnet 99 and the south pole of the permanent magnet 100 are directed downwardly. This is so for each carrier so that considered in the direction of travel a row of north poles alternating with south poles is realized.

From the above it follows that the auxiliary conveyor 34 comprises one hundred and sixty carriers 46 each carrying two code recorders which are each constituted by eleven magnetic bistable devices, and two fixed permanent magnets. It may consequently also be said that the auxiliary conveyor 34 comprises eleven longitudinal rows of 320 magnetic bistable devices, separated from a twelfth longitudinal row of 320 fixed permanent magnets wherein north poles alternate with south poles. All these rows are parallel to the direction of travel of the auxiliary conveyor.

It should be noted that the distances between the carriers 46 are such that the distances between the rods, such as 88, 99, carrying the permanent magnets are all identical. The velocity of the auxiliary conveyor 34 carrying these rods is such that each of these distances corresponds to a time period equal to $T/4$ or 125 milli-seconds.

The plurality of e.g. 150 letter holders 30 used are each provided with two compartments and since the destinations of the letters contained in the two compartments of a same letter holder 30 are recorded on the two code recorders of a same carrier 46, it is obvious that the displacement of these code recorders must be fully synchronized with that of the double-compartment letter holders. But each time such a letter holder passes a curved portion of 180°, such as 25, of the main conveyor 31 the position of these two compartments with respect to their direction of travel is reversed. Therefore it is also necessary to reverse the position of each pair of code recorders each time the position of the associated pair of letter compartments is reversed. For this reason two code recorders have been mounted on a same carrier 46.

During their travel along the main conveyor the letter holders are four times rotated over 180°, namely in the curved portions 25, 26, 27 and 28, 29. Therefore the carriers must also be rotated four times over 180°. However, instead of mounting the auxiliary conveyor 34 in the same serpentine fashion as the main conveyor 31, it has been preferred to use an endless conveyor with two parallel portions since this permits to realise an auxiliary conveyor having substantially the same length as the main conveyor, so that it may be mounted above the frame carrying this main conveyor. But in this case the carriers are only rotated twice over 180°. For this reason two additional inversion mechanisms 43, 44 have been provided. Hereby the portions 37, 38, 39 and 40 of the auxiliary conveyor 34 correspond to the portions 8, 9; 10 to 12; 14 to 17 and 18 to 21 of the main conveyor 31 respectively.

Each of the keyboards included in the transfer mechanisms TM1, TM2 is associated to a translator unit (not shown) adapted to translate a destination keyed in a 2-out-of-5 code which is then stored in a respective buffer memory unit 103 or 104 (FIG. 8). The outputs of these memory units 103 and 104 are coupled to the respective second memory units 105 and 106 which are of the same type as the memory units 103 and 104 respectively. Each of the outputs of the second memory unit 105 is connected to one input of a two-input coincidence gate, such as 107, the other inputs of these gates being connected to a same input terminal 108 which is controlled by the above mentioned transfer pulses 109. In an analogous manner each of the outputs of the second memory unit 106 is connected to one input of a two-input coincidence gate, such as 110, the other inputs of these gates being connected to a same input terminal 111 which is controlled by the above mentioned transfer pulses, 112 (FIG. 11). The outputs of two homologue gates, such as 107, 108, are connected to the inputs of a two-input mixer 113, the outputs of all these mixers being connected to corresponding inputs of a code translating circuit 114 which permits to translate the above mentioned 3000 possible destinations to e.g. 140 destinations. This circuit 114 also includes a translator unit which permits to translate each of these 140 destinations in a 3-out-of-11 code, and each of the eleven outputs of this circuit is connected to the one input of the two-input coincidence gates 115, 116, the other inputs of which are connected to the above mentioned terminals 108 and 111 respectively. The outputs of the gates, such as 115, are connected to corresponding inputs of the third memory unit 117, whereas the outputs of the gates, such as 116, are connected to corresponding inputs of the third memory unit 118.

The eleven outputs of the third memory unit 117 are each coupled to one input of a two-input coincidence gate, such as 119, the other inputs of all these gates being connected to a common terminal 120, to which the above mentioned setting authorization pulses 121 (FIG. 11) are applied. The output of each of these gates, such as 119 is connected to one end of a pair of series connected windings, such as 122, 123 of two setting electromagnets. The other ends of these eleven pairs of series connected windings are joined and connected to the movable armature of a bistable change-over contact 124. The right hand fixed contact of this change-over contact 124 is connected to the left hand fixed contact of the bistable change-over contact 125 and the left hand fixed contact of the change-over contact 124 is connected to the right hand fixed contact of the change-over contact 125, the movable armature of which is connected to a battery. The change-over contacts 124 and 125 are hence connected in an exclusive-OR circuit configuration and permit to obtain so called setting pulses 186 (FIG. 12), as will be explained later.

In an analogous manner the eleven outputs of the third memory unit 118 are each coupled to one input of a two-input coincidence gate, such as 127, the other inputs of all these gates being connected to a common terminal 128 to which the above mentioned setting authorization pulses 129 are applied. The output of each of these gates, such as 127, is connected to one end of a pair of series connected windings, such as 130, 131 of two setting electromagnets. The other ends of these eleven pairs of series connected windings are joined and connected to an arrangement comprising the change-over contacts 132, 133 by means of which so called setting pulses 134 (FIG. 11) are obtained, as will be explained later.

Near the curved portion 42 (FIG. 2) of the auxiliary conveyor 34 and transversally with respect to this conveyor are mounted in two parallel rows the eleven pairs of windings, such as 122, 123; 130, 131 of setting electromagnets or magnetizing sources. Hereby the eleven pairs of windings of each transverse row are each arranged in a corresponding one of the planes of the above mentioned eleven parallel longitudinal rows of magnetic bistable devices mounted on the auxiliary conveyor 34 and one winding of each pair is mounted above the upper permanent magnet of the corresponding bistable devices, whereas the other winding of this pair is mounted below the lower permanent magnet of this bistable device. As shown in FIG. 2 the windings 122, 130 and 123, 131 are mounted above and below the auxiliary conveyor 34 respectively. It should be noted that the windings of each of the above pairs are further so mounted that their ends directed toward the auxiliary conveyor exhibit poles of opposite polarity.

In the elongation of the above two rows of setting electromagnets and below the above mentioned twelfth row of fixed permanent magnets are mounted the change-over contacts 124, 125, 132, 133, the distance between two interconnected change-over contacts 124, 125; 132–133 being somewhat smaller than the distance between the axes of two rods supporting two fixed permanent magnets such as 99, 100 of the above twelfth row. This is schematically represented in FIG. 8. The operation of one of the identical arrangements, namely the one including the bistable change-over contacts 124, 125 will now be described.

The bistable change-over contacts 124, 125 are of the type described in the U.S. Patent No. 3,048,677 i.e. the fixed contacts are connected to poles of opposite polarity of two permanent magnets. As shown, the left and right hand fixed contacts of each change-over contact are connected to a south pole and to a north pole of two permanent magnets respectively. Consequently, when a north pole of a permanent magnet is brought above one of the change-over contacts, the latter remains in the position shown, whereas when a south pole of a permanent magnet is brought above a change-over contact the latter is moved into its other position. Hence, when the permanent magnets 99 and 100, schematically represented on FIG. 8, and having their north and south poles directed downwardly respectively are moved in proximity of the change-over contacts 124, 125 at a speed such that the distance between these two fixed permanent magnets corresponds approximately to T/4 or 125 milliseconds, the change-over contact 125 will be brought in the right hand position upon the passage of the north pole of permanent magnet 99, i.e. at the moment t1. At that moment the change-over contact 124 is still in its right hand position, wherein it has been brought by the north pole of permanent magnet 99. At the moment t2 the change-over contact 124 is brought in its left hand position due to the passage of the south pole of the permanent magnet 100. At the moment t3 the change-over contact 125 is again brought in its left hand position upon the passage of the permanent magnet 100 since the time interval corresponding to the distance between the permanent magnets 99 and 100 is approximately equal to T/4. Also, the time interval between t1 and t3 is approximately equal to T/4 or 125 milliseconds. In the same manner, at the moment t4 the change-over contact 124 is again brought in its right hand position upon the passage of the permanent magnet following the permanent magnet 100, the time interval between t2 and t4 being also approximately equal to T/4. In the above, the time interval between t1 and t3, on the one hand, and between t2 and t4, on the other hand, is only approximately equal to T/4 since this is a function of the mechanical variations of the length of the auxiliary conveyor. Since the change-over contacts 124, 125 are in fact interconnected so as to constitute an exclusive-OR circuit, as already mentioned above, the armature of contact 124 is only connected to a battery during the setting pulses 126 (FIG. 3) the time duration of each of which is considerably smaller than T/4 and for instance equal to about 90 milliseconds. These setting pulses 126 and the setting pulses 134 are represented in FIG. 11. By a suitable regulation of the above timing arrangement it is obtained that each first of four successive pulses 126, 134 is completely overlapped by a setting authorization pulse 121, 129 respectively, so that even when these setting pulses are slightly shortened, lengthened or shifted, due to the travel speed of the auxiliary conveyor being not constant the setting pulses 126, 134 are always located within the authorization period determined by the respective authorization pulses 121, 129. It should be noted that since there are four setting pulses per time period T, two more operators could be associated to the sorting machine. Moreover although a single arrangement with two change-over contacts such as 124, 125 would in principle be sufficient, it has been preferred to associate such an arrangement to each operator in order that the operators should be independent from each other.

One hundred and forty parallel sets of each so-called reading change-over contacts are mounted below and tranversely with respect to the auxiliary conveyor 34 in such a manner that the three contacts of each such sets are each arranged in one of the planes of the eleven parallel longitudinal rows formed by the magnetic bistable devices mounted on the auxiliary conveyor 34. These change-over contacts are of the same type as the contacts 124, 125, 132, 133 and are mounted in groups 135 to 148 corresponding to the groups of letter destination bins shown in FIG. 1. The three change-over contacts of each of these 140 sets are connected between a ground and a battery in series with the winding of the transfer electromagnet associated to a corresponding one of the 140 letter bins, in such a manner that this electromagnet is energized when these three change-over contacts are influenced by a code recorder the code of which corresponds to that of the letter bin to which this electromagnet is associated. The three change-over contacts of each of the sets mounted below the portions 37 and 39 of the auxiliary conveyor 34 are interconnected in series in such a manner that a connection is established between the ground and the battery when these change-over contacts are each brought in their work position by a south pole of a corresponding magnetic bistable device of a code recorder. On the other hand, the three change-over contacts of each of the sets mounted below the portions 38 and 40 of the auxiliary conveyor 34 are interconnected in series in such a manner that a connection is established between the ground and the battery when these change-over contacts are each brought in their work position by a north pole of a corresponding magnetic bistable device of a code recorder. It is necessary to interconnect the change-over contacts of the sets mounted below the portions 37 and 39 of the auxiliary conveyor in a different way than those of the sets mounted below the portions 38 and 40 due to the fact that the inversion mechanisms 43, 44 produce an inversion of the magnetic bistable devices.

Finally, two auxiliary rows 149 and 152 of eleven reset permanent magnets are mounted below and above the auxiliary conveyor 34 in such a manner that each pair of these reset magnets is arranged in a corresponding one of the planes of the abovementioned parallel longitudinal rows of magnetic bistable devices mounted on the auxiliary conveyor. The poles of these reset magnets are thereby so directed that the bistable devices upon passing these reset magnets will all be brought in a position such that their north pole is directed downwardly.

Principally referring to FIGURES 8, 12 and 13, the operation of the sorting machine will now be described in detail.

It is supposed that the operator OP1 controlling the transfer mechanism TM1 handles a letter. When this letter is located in the viewing position of this transfer mechanism TM1 the destination inscribed thereon is read and when the letter has reached the indexing position the operator OP1 indexes this destination by typing the four figures of the number by means of which it is characterized. These figures are each translated in a 2-out-of-5 code and stored in the buffer memory 103 at the moment T1. At the moment T2 the operator OP1 tries to depress the push-button of the transfer mechanism TM1, blocking means (not shown) is provided for preventing this push-button from being depressed when information is stored in the memory unit 105. It is supposed that this memory unit 105 is free, so that by depressing the push-button the transfer of the letter is initiated and one is sure that a transfer pulse 109 will be generated during the following time period T.

At the moment T2 the letter starts falling towards one of the two chutes provided with the respective movable bottom flaps 22' and 23'. This is indicated by the curve 150 of FIG. 12. Since the push-button has been depressed during the time interval the cam controlled contact s' is open, this letter will be dropped on the closed bottom flap 22' which is reached at the moment T4, i.e. about 300 milliseconds after it has left the indexing position. The letter will remain on the bottom flap 22' until this flap is displaced i.e. till the moment T8. From that moment on the letter starts falling on an additional conveyor (not shown) which is reached at the moment T14, i.e. about 300 milliseconds after it has left the bottom flap 22'. By this additional conveyor the letter is then conveyed towards a letter holder of the main conveyor. All this has been clearly described in the above mentioned U.S. patent application Ser. No. 427,748.

Simultaneously with the physical transfer of the letter towards the main conveyor the destination information is shifted to the row of setting electromagnets including the windings 122, 123, in the manner described hereinafter. At the moment T2 the destination information stored in the buffer memory unit 103 is shifted towards the memory unit 105 wherein it is registered. This registering operation is finished at the moment T3 and the information remains registered in this unit 105 until the start of the transfer pulse 109, i.e. until the moment T6. During the time duration of this transfer pulse 109 the transfer of the destination information is performed from memory unit 105 to memory unit 117 via the gates 107, the mixers 113, the code translating circuit 114 and the gates 115. This transfer is finished at the moment T7 and three of the eleven output leads of the memory unit 117 are then activated, i.e. connected to a ground. At the moment T9 the inputs 120 of all the coincidence gates, such as 119, are activated by a setting authorization pulse 121, but the setting of the electromagnets, such as 122, 123, cannot yet take place since the arrangement comprising the change-over contacts 124, 125 does not yet provide a connection to a battery. This happens only at the moment T10 for the time duration of a setting pulse 126, i.e. until moment T12. During this time duration the windings, such as 124, 125, of three of eleven setting electromagnets are energized but the three corresponding setting electromagnets are already operated at the moment T11. Consequently, three of the eleven bistable devices of the code recorder passing under these setting electromagnets are set, i.e. rotated over 180° in a direction such that their south pole polarity is directed downwardly. At the moment the thus set code recorder arrives under the row of three change-over contacts corresponding to the code registered in this recorder, an operating circuit is established for the transfer electromagnet of the letter bin.

The various operations have been so synchronized that at the moment the transfer electromagnet is operated, the letter holder which passes at that moment over a bin contains the letter the destination of which corresponds to that of this when the lever arrangement associated to the letter holder is operated. Consequently, this letter is dropped in the destination bin.

Finally when the code recorder passes between the rows of set magnets 149, 152 it is reset. In the same way the operated lever arrangement of the letter holder is reset by the reset member 33.

While the principles of the invention have been described above in connection with specific apparatus, it is to be clearly understood that this description is made only by way of example and not as a limitation on the scope of the invention.

We claim:
1. An automatic sorting machine for automatically placing articles of mail into selective designation bins for sorting purposes,
   said machine comprising an endless main conveyor with a plurality of turns and runs,
   article holders coupled to said conveyors, each of said article holders having a plurality of compartments,
   an endless auxiliary conveyor with at least a first and a second run moving in synchronism with said main conveyor,
   a carrier coupled to said auxiliary conveyor for each article holder coupled to said main conveyor,
   each of said carriers having a plurality of code recorders mounted thereon with each of said recorders representing one of said compartments,
   said code recorders comprising a plurality of bistable recorder elements for registering therein distinctive codes designating selected ones of said destination bins,
   detection means mounted on said auixliary conveyor and operatively associated with each of said destination bins,
   said detection means operated responsive to the detection by said code recorders of the registered destination code of said associated destination bins,
   transfer means operated responsive to the operation of said detection means for transferring articles from said holders to said selected destination bins, and
   inversion means mounted along said at least first and second runs of said auxiliary conveyor corresponding to predetermined turns in said main conveyor to maintain the positions of said code recorders of said carriers substantially constant relative to the compartments of said article holders as said holders are conveyed along the said turns and runs of said main conveyor.

2. The sorting machine of claim 1 wherein
   said inversion means comprises: first axle means extending from each of said carriers and rotatably mounted to said auxiliary conveyor,
   lever arm means rigidly secured at one end of said first axle means,
   first roller means disposed at the other end of said lever arm means,
   said first roller means being freely rotatable about a second axle means which is parallel to said first axle means,
   first and second parallel guide plates for guiding said first roller means,
   at least one portion of said first and second parallel guide plates being shaped so that in the plane perpendicular to the said axles the trajectory followed by said first roller means when travelling along said shaped portions of said guide plates and the trajectory followed by said auxiliary conveyor substantially forms a triangle, and
   so that when said first roller means are moved between said shaped portions by said auxiliary conveyor, the angle between said lever arm means and the trajectory of said auxiliary conveyor, the angle between said lever arm and the trajectory of said auxiliary conveyor increases to a maximum,
   abutment means for temporarily maintaining said first roller means in the position attained when said maximum angle is reached compelling said lever arm and said carrier to pivot about said second axle whereafter said angle between said lever arm and said trajectory of said auxiliary conveyor decreases to zero.

3. The sorting machine of claim 2, wherein
   said first guide plate is the one nearest to said auxiliary conveyor, and
   wherein said abutment means comprises resilient means,
   means for mounting said resilient means at an interruption of the shaped portion of said first guide plate,
   said resilient means exerting a pressure in a rearward direction with respect to the direction of travel of said auxiliary conveyor.

4. The sorting machine of claim 3, wherein
   said resilient means comprises a freely rotatable roller, and spring controlled lever means for mounting said freely rotatable roller.

5. The sorting machine of claim 3 wherein
   the shaped portion of said second guide plate comprises a first straight portion before said abutment means, and a second straight portion after said abutment means so that said first roller means are temporarily maintained by said abutment means.

6. The sorting machine of claim 5 wherein
said abutment means is rounded in conformity with the periphery of said first roller means.

7. The sorting machine of claim 2, wherein
said bistable recorder elements comprise magnetic bistable devices having first and second rotatable permanent magnets each having two poles and each mounted in close proximity of each other, whereby when said first permanent rotatable magnet is operatively associated with a magnetizing source with at least two stable conditions, said first and second permanent magnets remain in their position or are both angularly displaced towards a position wherein the pole of said first permanent magnet having a polarity opposed to that exhibited by said magnetizing source is nearest to said magnetizing source.

8. The sorting machine of claim 6, wherein
said carrier comprises a bar, two identical strips which are arranged along opposite longitudinal sides of said bar,
said strips having at each of their longitudinal edges a plurality of oppositely located transverse incisions,
a plurality of plates, each of said plates provided with at least one aperture,
said plates being mounted perpendicularly on said strips at the place of said incisions,
said bar fitting through the apertures of said plates and being secured therebetween to thereby fix said plates onto said bar due to shape of said apertures in each of said plates being substantially identical to the cross-section of said bar plus that of said two strips at the place of said incisions.

9. The sorting machine of claim 8, wherein
said plurality of plates constitute supports for at least two parallel rods which are perpendicaular to said plates,
said first and second rotatable permanent magnets arranged between said plates and supported by said parallel rods, in close proximity of each other to constitute said magnetic bistable device, whereby when one of said rotatable permanent magnets is operatively associated with a magnetizing source with at least two stable conditions, the magnets of said pair of magnets remain in their position or are both angularly displaced towards a position wherein the pole of said one permanent magnet having a polarity opposed to that exhibited by said magnetic source is nearest to said magnetic source.

10. The sorting machine of claim 7 wherein
stop means are included on said first and second rotatable permanent magnets for preventing rotation larger than 180°.

11. The sorting machine of claim 10, wherein
said stop means comprises wing members on said first and second rotatable permanent magnets and at least one stop element located within the peripheries of each of the circles described by the wing members of said first and second rotatable permanent magnets when said magnets are rotated.

12. The sorting machine of claim 10, wherein
said stop means comprises a single stop element effective in preventing both said first and second rotatable permanent magnets from rotating over 180°.

13. The sorting machine of claim 12, wherein
said first and second rotatable permanent magnets are mounted on said first and second axles,
said axles passing through the center of gravities of said first and second rotatable permanent magnets, and
wherein said wing members are lateral extensions in the direction of said axles.

14. The sorting machine of claim 13, wherein
said first and second rotatable permanent magnets are mounted around a first and a second non-magnetic body respectively,
wherein lateral wing means are integral parts of said non-magnetic bodies, and
wherein said stop element comprises a lip forming part of each of said plates arranged between said rods.

15. The sorting machine of claim 14, wherein a second magnetizing source is associated with said second rotatable permanent magnet and
wherein the polarity of said second magnetizing source is opposite of the polarity of said first magnetizing source.

16. The sorting machine of claim 7 including a control system for registering information in said recorders,
said system comprising at least one set of electrically operated coding means mounted to said auxiliary conveyor for coding information into said bistable recorder elements,
said coding means comprising electrical operating circuits,
said operating circuits including fixedly mounted polarized electric contacts,
a first and a second fixed permanent magnet mounted on said carriers for actuating said polarized electrical contacts to thereby operate said coding means, and
wherein said magnetizing source comprises electromagnets serially connected through said contacts to a power source.

References Cited
UNITED STATES PATENTS 2,807,376  9/1957  Lens _____ 214—11
2,873,863  2/1959  Lens _____ 214—11

GERALD M. FORLENZA, *Primary Examiner.*

R. B. JOHNSON, *Assistant Examiner.*

U.S. Cl. X.R.

198—38